US010149163B2

(12) United States Patent
Chen et al.

(10) Patent No.: US 10,149,163 B2
(45) Date of Patent: Dec. 4, 2018

(54) METHODS AND APPARATUSES OF DEVICE IDENTITY CHECK IN A CORE NETWORK FOR A WIRELESS NETWORK

(71) Applicant: Telefonaktiebolaget LM Ericsson (publ), Stockholm (SE)

(72) Inventors: Ping Chen, Shanghai (CN); Wei Xu, Shenzhen (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/580,014

(22) PCT Filed: Jun. 17, 2015

(86) PCT No.: PCT/CN2015/081648
§ 371 (c)(1),
(2) Date: Dec. 6, 2017

(87) PCT Pub. No.: WO2016/201642
PCT Pub. Date: Dec. 22, 2016

(65) Prior Publication Data
US 2018/0176777 A1    Jun. 21, 2018

(51) Int. Cl.
*H04W 12/06* (2009.01)
*H04W 84/04* (2009.01)
(Continued)

(52) U.S. Cl.
CPC ............ *H04W 12/06* (2013.01); *H04W 84/04* (2013.01); *H04W 84/12* (2013.01); *H04W 88/16* (2013.01)

(58) Field of Classification Search
CPC ..... H04W 84/12; H04W 12/06; H04W 4/005; H04W 4/008; H04W 4/023; H04W 4/70; H04W 4/08; H04W 4/50
See application file for complete search history.

(56) References Cited

U.S. PATENT DOCUMENTS

2014/0349614 A1* 11/2014 Starsinic ................ H04W 4/70
455/411

FOREIGN PATENT DOCUMENTS

| CN | 1972505 A | 5/2007 |
| CN | 101212423 A | 7/2008 |
| CN | 101909248 A | 12/2010 |

OTHER PUBLICATIONS

International Search Report and Written Opinion dated Mar. 7, 2016 for International Application Serial No. PCT/CN2015/081648, International Filing Date: Jun. 17, 2015 consisting of 7-pages.

(Continued)

*Primary Examiner* — Diane D Mizrahi
(74) *Attorney, Agent, or Firm* — Christopher & Weisberg, P.A.

(57) ABSTRACT

A method and apparatus of device identity check at a central authorization entity in a core network for a wireless network and a method and apparatus of device identity check at a gateway in a core network for a wireless network are disclosed. The method of device identity check at the central authorization entity may include obtaining, in response to an authorization request from a terminal device via another access network, an identity of the terminal device, sending an identity check request containing the identity of the terminal device to an identity check entity, receiving a check response containing an identity check result for the identity of the terminal device from the identity check entity, and sending an authorization result for the terminal device based on the identity check result.

17 Claims, 7 Drawing Sheets

(51) Int. Cl.
  *H04W 84/12*    (2009.01)
  *H04W 88/16*    (2009.01)

(56) References Cited

OTHER PUBLICATIONS

3GPP TS 23.234 V12.0.0 (Sep. 2014) 3rd Generation Partnership Project; Technical Specification Group Services and System Aspects; 3GPP system to Wireless Local Area Network (WLAN) interworking; System description (Release 12), Sep. 2014 consisting of 84-pages.

3GPP TS 23.401 V12.8.0 (Mar. 2015) 3rd Generation Partnership Project; Technical Specification Group Services and System Aspects; General Packet Radio Service (GPRS) enhancements for Evolved Universal Terrestrial Radio Access Network (E-UTRAN) access (Release 12), Mar. 2015 consisting of 308-pages.

3GPP TS 23.402 V12.8.0 (Mar. 2015) 3rd Generation Partnership Project; Technical Specification Group Services and System Aspects; Architecture enhancements for non-3GPP accesses (Release 12), Mar. 2015 consisting of 290-pages.

3GPP TS 29.272 V13.1.0 (Mar. 2015) 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13), Mar. 2015 consisting of 136-pages.

3GPP TS 29.273 V12.7.0 (Mar. 2015) 3rd Generation Partnership Project; Technical Specification Group Core Network and Terminals; Evolved Packet System (EPS); 3GPP EPS AAA interfaces (Release 12), Mar. 2015 consisting of 136-pages.

* cited by examiner

METHODS AND APPARATUSES OF DEVICE IDENTITY CHECK IN A CORE NETWORK FOR A WIRELESS NETWORK

CROSS-REFERENCE TO RELATED APPLICATIONS

This application is a Submission Under 35 U.S.C. § 371 for U.S. National Stage Patent Application of International Application Number: PCT/CN2015/081648, filed Jun. 17, 2015 entitled "METHODS AND APPARATUSES OF DEVICE IDENTITY CHECK IN A CORE NETWORK FOR A WIRELESS NETWORK," the entirety of which is incorporated herein by reference.

TECHNICAL FIELD

The non-limiting and exemplary embodiments of the present disclosure generally relate to the technical field of wireless communications, and specifically to a method and apparatus of device identity check at a central authentication entity in a core network for a wireless network and a method and apparatus of device identity check at a gateway in a core network for a wireless network.

BACKGROUND

This section introduces aspects that may facilitate a better understanding of the disclosure. Accordingly, the statements of this section are to be read in this light and are not to be understood as admissions about what is in the prior art or what is not in the prior art.

Wi-Fi or WiFi is a technology for local area wireless computer networking, which allows terminal devices to access a network, mainly using the 2.4 GHz and 5 GHz radio bands. Currently, the Wi-Fi has been considered as a key candidate for a small cell solution for mobile broadband heterogeneous networks since the Wi-Fi could provide a good supplement to existing wireless communication networks. Currently, almost in all corners of the modern world, there are intense activities on how to integrate Wi-Fi with the Third Generation Partnership Project (3GPP) and how to offer a "carrier Wi-Fi" solution. In the "carrier Wi-Fi" solution, the Wi-Fi is integrated with the 3GPP Evolved Packet Core (3GPP EPC) in a similar fashion to any 3GPP radio access technology, and the access authentication and authorization (AAA) is controlled through a core network for the 3GPP network. Standardization and certification organizations such as 3GPP, Wi-Fi Alliance (WFA), Groupe Speciale Mobile Association (GSMA) and Wireless Broadband Alliance (WBA) are producing materials on carrier-integrated Wi-Fi and at the same times, many network equipment manufacturers are making some products in which the Wi-Fi is integrated on different levels.

In fact, there were already some network integrated Wi-Fi, such as Ericsson Network Integrated Wi-Fi (ENIW), which could offer a way to seamlessly access Wi-Fi and EPC. Therein, Wi-Fi authentication is performed through Subscriber Identity Module (SIM) based authentication methods, such as Extensible Authentication Protocol (EAP) SIM, EAP-Authentication and Key Agreement (EAP-AKA), improved EAP-AKA (EAP-AKA') toward the same network entities as those used for the 3GPP. Currently, for 2 Generation (2G), 3 Generation (3G) and 4 Generation (4G) network access, 3GPP technology specification (TS) 23.401 and TS 23.060 have specified a Mobile Equipment (ME) identity procedures between Mobility Management Entity/Serving General Packet Radio Service Support Node (MME/SGSN) and Equipment Identity Register (EIR). However, the ME identity procedures cannot applied to device identity check for Wi-Fi devices and at the same time there is no a solution or standardization for device identity check when they connect to operator core network via Wi-Fi yet, as such operators are not able to control access of the mobile device to operator walled garden services when the mobile device has a fault or blacklisted, which might bring many potential risks.

Therefore, in the art, there is a need for a new solution for device identity check on the terminal device when the terminal device is connected to a non-3GPP access network such as the Wi-Fi network.

SUMMARY

Various embodiments of the present disclosure mainly aim at providing methods and apparatuses for inter-network measurement in a wireless network to facilitate interference coordination in 5G networks. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method of device identity check at a central authorization entity in a core network for a wireless network. The method comprises: obtaining, in response to an authorization request from a terminal device via another access network, an identity of the terminal device; sending an identity check request containing the identity of the terminal device to an identity check entity; receiving a check response containing an identity check result for the identity of the terminal device from the identity check entity; and sending an authorization result for the terminal device based on the identity check result.

In one embodiment of the present disclosure, the obtaining an identity of the terminal device may comprise sending an identity request in response to the authorization request; and receiving an identity response containing the identity of the terminal device.

In another embodiment of the present disclosure, the identity request may be sent, in an identity request message, to a gateway for accessing the core network by the terminal device via the other access network, and the identity response may be received in an identity response from the gateway.

In a further embodiment of the present disclosure, the identity request may be further sent to the terminal device at the gateway in an authorization response for the authorization request, and the identity of the terminal device may be received at the gateway in a new authorization request containing the identity of the terminal device.

In a yet further embodiment of the present disclosure, the method may further comprise checking whether identity check functionality is enabled, wherein the identity of the terminal device is obtained further in response to determining that the identity check functionality is enabled.

In a second aspect of the present disclosure, there is provided a method of device identity check at a gateway in a core network for a wireless network. The method comprises: receiving, from a central authorization entity, an identity request for an identity of a terminal device which initiated an authorization request via another access network; sending the identity request to the terminal device in an authorization response for the authorization request; receiving the identity of the terminal device contained in a new authorization request initiated by the terminal device via the other access network; and sending the identity of the terminal device to the central authorization entity in an identity response.

In a third aspect of the present disclosure, there is provided an apparatus for device identity check at a central authorization entity in a core network for a wireless network. The apparatus comprises: an identity obtainment module, configured to obtain, in response to an authorization request from a terminal device via another access network, an identity of the terminal device; a check request sending module, configured to send an identity check request containing the identity of the terminal device to an identity check entity; a check response receiving module, configured to receive a check response containing an identity check result for the identity of the terminal device from the identity check entity; and an authorization result sending module, configured to send an authorization result for the terminal device based on the identity check result.

In a fourth aspect of the present disclosure, there is provided an apparatus for device identity check at a gateway in a core network. The apparatus comprises: an identity request receiving module, configured to receive, from a central authorization entity, an identity request for an identity of a terminal device which initiated an authorization request via another access network; an identity request sending module, configured to send the identity request to the terminal device in an authorization response for the authorization request; a device identity receiving module, configured to receive the identity of the terminal device contained in a new authorization request initiated by the terminal device via the other access network; a device identity sending module, configured to send the identity of the terminal device to the central authorization entity in an identity response.

In a fifth aspect of the present disclosure, there is provided a central authorization entity for device identity check in a core network for a wireless network. The central authorization entity comprises a processor and a memory, the memory containing instructions executable by said processor whereby the central authorization entity is operative to perform the method according to any of embodiments of the first aspect.

In a sixth aspect of the present disclosure, there is provided a gateway for device identity check in a core network for a wireless network. The gateway comprises a processor and a memory, said memory containing instructions executable by said processor whereby the gateway is operative to perform the method according to any of embodiments of the second aspect.

In a seventh aspect of the present disclosure, there is provided a central authorization entity for device identity check in a core network for a wireless network. The central authorization entity comprises processing means adapted to perform the method according to according to any of embodiments of the first aspect.

In an eighth aspect of the present disclosure, there is provided is provided a gateway for device identity check in a core network for a wireless network. The gateway comprises processing means adapted to perform the method according to any of embodiments of the second aspect.

According to various aspects and embodiments as described above, when a terminal device tries to access the core network via an access network (for example, Wi-Fi network) different from the wireless network (for example the 3GPP wireless network), the central authorization entity can obtain an identity of the terminal device in response to an authorization request from this terminal device. Thus, the central authorization entity could request an identity check entity to check the identity of the terminal device. Therefore, the identity status of a terminal device may be checked when the terminal device is connected to the core network via the other access network, and thus the terminal device with an abnormal identity could be discriminated, which enables control of terminal device access to operator walled garden services via other access networks. By this means, potential risks brought by failing to control the terminal device access can be removed and thus a much safer and more reliable device access and device communication can be provided.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or signs are used to designate like or equivalent elements. The drawings are illustrated for facilitating better understanding of the embodiments of the disclosure and not necessarily drawn to scale, in which.

DETAILED DESCRIPTION

Figure 1:
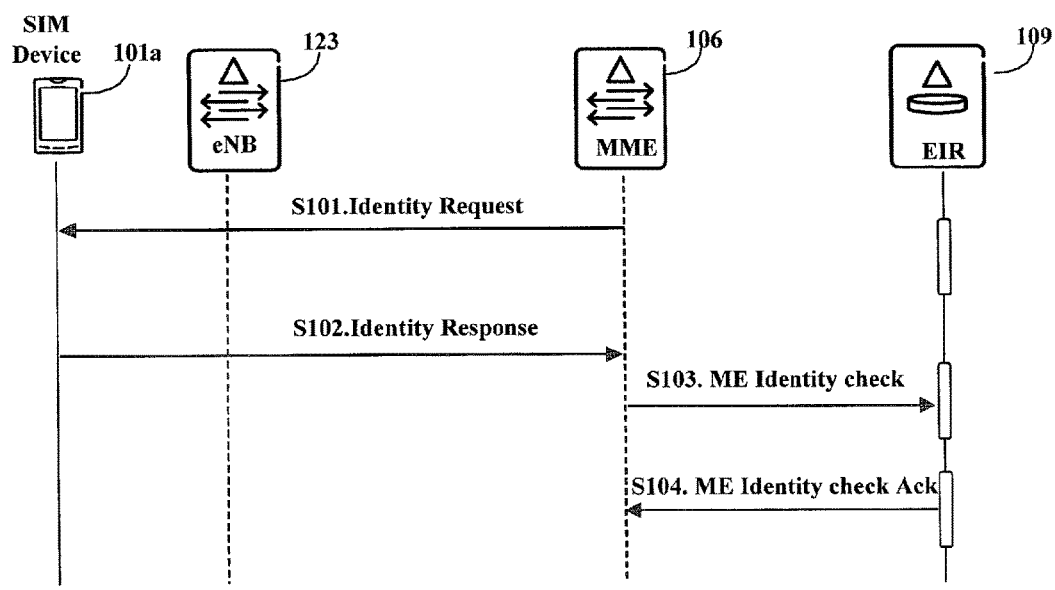
FIG. 1 schematically illustrates an identity check procedure in a long term evolution (LTE) system.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "terminal device" used herein may refer to any terminal or UE having wireless communication capabilities, including but not limited to, mobile phones, cellular phones, smart phones, or personal digital assistants (PDAs), portable computers, image capture devices such as digital cameras, gaming devices, music storage and playback appliances and the like. In the following description, the terms "user equipment" or "UE" and "terminal device" may be used interchangeably.

Hereinafter, reference will be first made to FIG. 1 to describe an identity check procedure in a long term evolution (LTE) system. However, it should be appreciated that it is given only for illustration purposes. In FIG. 1, an existing solution for a Subscriber Identity Module (SIM) terminal device as specified in 3GPP TS 23.401 is illustrated and as illustrated, at step 101, the Mobility Management Entity (MME) 106 sends an identity request to the SIM device 101a through an evolved node B (eNB) 123. In response to the identity request from the MME 106, the SIM device 101a sends an identity response containing the mobile equipment (ME) identity for the SIM device 101a back to the MME 106 at step 102. The MME 106 checks whether it is configured to check the International Mobile Equipment Identity (IMEI). If so, at step 103, the MME 106 sends an ME identity check message to the EIR 109. The EIR 109 performs the identity check on the ME identity and at step S104, sends an ME identity check acknowledge to the MME 106. In the ME identity check acknowledge, it indicates the identity check result and thus, the MME 106 can analyze the identity check result sent from the EIR 109 to determine its subsequent actions. For example, the MME may send an Attach Rejection if the identity check result indicates the Mobile Equipment is blacklisted.

Although, for 2G/3G/4G accesses, 3GPP TS 23.401 and TS 23.060 has specified a ME identity check procedure (S13 interface) between the MME/SGSN and the EIR. However, as mentioned in the background, there is no a solution or standardization for mobile devices identity check when they connect to operator core network via a Wi-Fi network yet and this identity check functionality is rather desirable. In view of this, in embodiments of the present disclosure, there is provided a new solution for device identity check for a terminal device connected to the core network via another access network such as Wi-Fi. Hereinafter, reference will be made to FIGS. 2 to 8 to describe the solution for device identity check for the terminal device as provided herein in detail.

Figure 2:
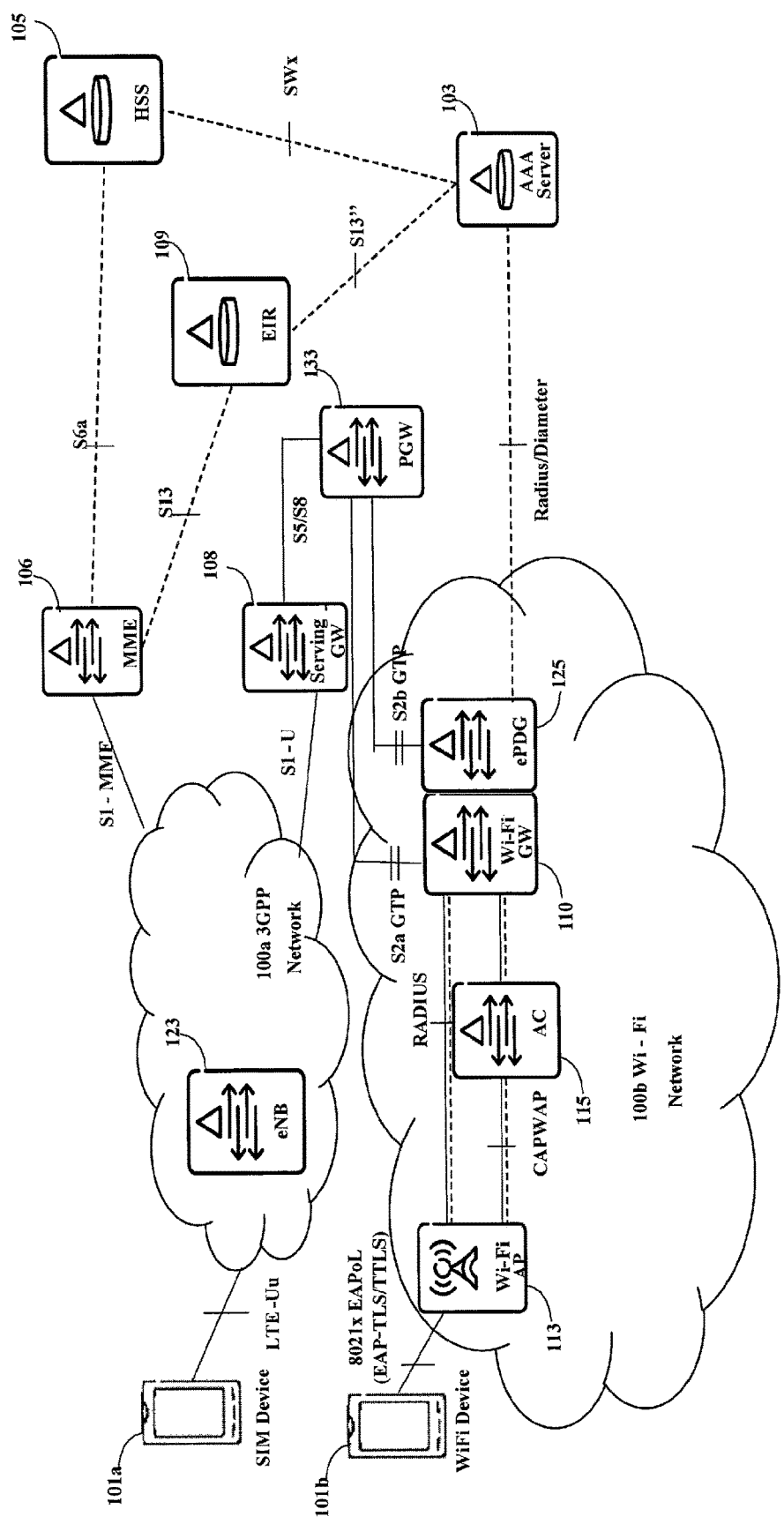
FIG. 2 schematically illustrates an overall architecture for device identity check according to an embodiment of the present disclosure.

FIG. 2 schematically illustrates an overall architecture for device identity check according to an embodiment of the present disclosure. As illustrated in FIG. 2, the SIM device 101a is a terminal device that can be served by a base station (eNB) 123 in a 3GPP network 100b and it accesses to the 3GPP network through it serving eNB 123 via LTE-Uu interface, the 3GPP network 100b may be connected to the MME 106 via the S1-MME interface and connected to the serving GW 108 via S1-U interface. The MME may request, via an S6a interface, the Home Subscriber Server (HSS) 105 to perform subscriber authentication and authorization and request EIR 109 to perform the device ID check via an S13 interface. The Wi-Fi device 101b is a terminal device which is capable of accessing to the Wi-Fi network 100b through a Wi-Fi access point (AP) 113 based on Wi-Fi technology. Particularly, the Wi-Fi device 101b accesses the Wi-Fi AP 113 through 802.1x EAPoL (EAP-TLS/TTLS) and the Wi-Fi AP 113 can in turn communicate with the Wi-Fi Access controller (AC) 105 through Control And Provisioning of Wireless Access Points Protocol Specification (CAPWAP). The AC 105 is further connected to the Wi-Fi gateway 110 and the ePDG 125 or the Wi-Fi AP can directly communicate with the two gateways 110 and 125 through Remote Authentication Dial In User Service (RADIUS). In a case the Wi-Fi network is a trusted non-3GPP access network, the Wi-Fi GW 110 will be used, while if the network is an untrusted non-3GPP access network, the ePDG 125 will be used. The gateway 110, 125 are further commented to a Packet Data Network (PDN) Gateway (PGW) through S2a GTP/S2b GTP interfaces which may be connected to the serving GW through S5/S8 and the gateway 110, 125 are also connected to the AAA server 103 through Radius/Diameter. The AAA server 103 may communicate with the HSS via SWx interface and particularly, the AAA server 103 may also communicate with the EIR 109 through S13" interface. By means of such an architecture, the existing EIR capacity can be reused to check the ID check for a Wi-Fi device through a new S13" interface between the EIR 109 and the AAA server 103, and thus the device ID check for Wi-Fi access scenario is enabled. Next, more detailed description of the device ID check for Wi-Fi access scenario will be presented.

Figure 3:
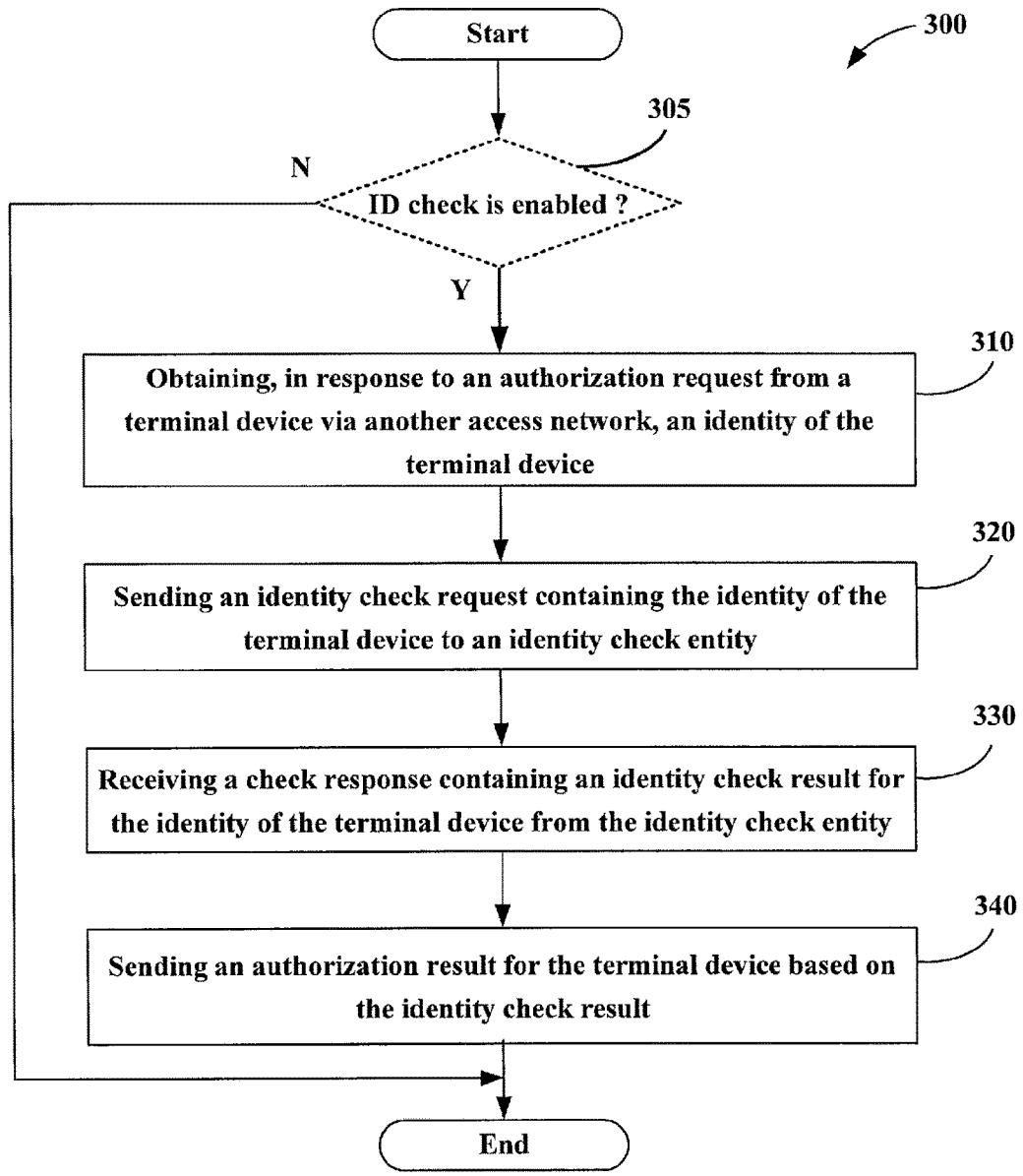
FIG. 3 schematically illustrates a flow chart of a method of device identity check at a central authentication entity of a core network for a wireless network according to an embodiment of the present disclosure.

Reference is made to FIG. 3, which schematically illustrates a flow chart of a method 300 of device identity check at a central authentication entity of a core network for a wireless network according to an embodiment of the present disclosure. As illustrated in FIG. 3, at step 305, the central authentication entity, such as the AAA server 103 as illustrated in FIG. 2, may first determine whether the ID check is enabled. This step can be performed when there is an authentication request from a terminal device. The terminal device herein can be a Wi-Fi device and the authentication request is initiated by the Wi-Fi device and transmitted to the AAA server 103 though the ePDG 125 if the Wi-Fi network is an untrusted non-3GPP network or through the Wi-Fi GW 110 if the Wi-Fi network is an trusted non-3GPP network. The Wi-Fi GW 110 or the ePDG 125 is a gateway, through which the terminal device is enabled to access the core network via the other access network different from the 3GPP network. When the AAA server receives the authentication request through the gateway 110 or 125 and determines that the ID check is enabled, the method proceeds with step 310; otherwise, the method ends. Herein, it shall be appreciated that this step 305 is an optional operation, and in fact, the method can start directly from step S310, i.e., step 305 can be omitted in some embodiments of the present disclosure and in such a case, it is default to perform the ID check.

Then at step 310, the central authentication entity may obtain an identity of the terminal device in response the authentication request from the terminal device. Particularly, the central authentication entity may send an identity request to the ePDG 125 or the Wi-Fi GW 110 for example in an identity request message. The ePDG 125 or the Wi-Fi GW 110 will ask the terminal device to provide its identity such as International Mobile Equipment Identity (IMEI) in an authorization response which is a response for the authorization request initiated by the terminal device. Upon receiving the authorization request, the terminal device sends a new authorization request and in this new authorization request is contained the identity of the terminal device such as its IMEI. The ePDG 125 or the Wi-Fi GW 110 receives the identity of the terminal device contained in the new authentication request and sends the identity of the terminal device to the central authentication request in an identity response. Thus, the central authentication entity can receive the identity response and obtain the identity of the terminal device contained in the identity response. By this means, the identity of the terminal device can be obtained by the central authorization entity at step 310.

Afterwards, at step 320, the central authentication entity may send an identity check request containing the identity of the terminal device to an identity check entity. The identity check entity could be the EIR in the 3GPP core network as mentioned hereinabove. Upon receiving the identity check request, the identity check entity will perform ID check on the identity of the terminal device contained in the identity check request. The ID check on the terminal device can be performed in a similar way to the ID check on the terminal device using the 3GPP network. In other words, in embodiments of the present disclosure, the EIR is not changed and it works as usual. Thus, details about that can be omitted for a purpose of simplification.

Next, at step 330, the central authorization entity will receive a check response from the identity check entity. After the ID check is performed by the identity check entity, it will send back to the central authorization entity the check response, in which the ID check result for the terminal device is contained. Thus, the central authorization entity may obtain the ID check result from the check response.

Based on the ID check result, the central authorization entity may determine the authorization result to be transmitted at step 340. For example, if the ID check result indicates the identity is unknown or blacklisted, the central authorization entity may determine that it will transmit a reject message; otherwise, it will send an authorization success to permit the terminal device to access the core network.

Figure 4:
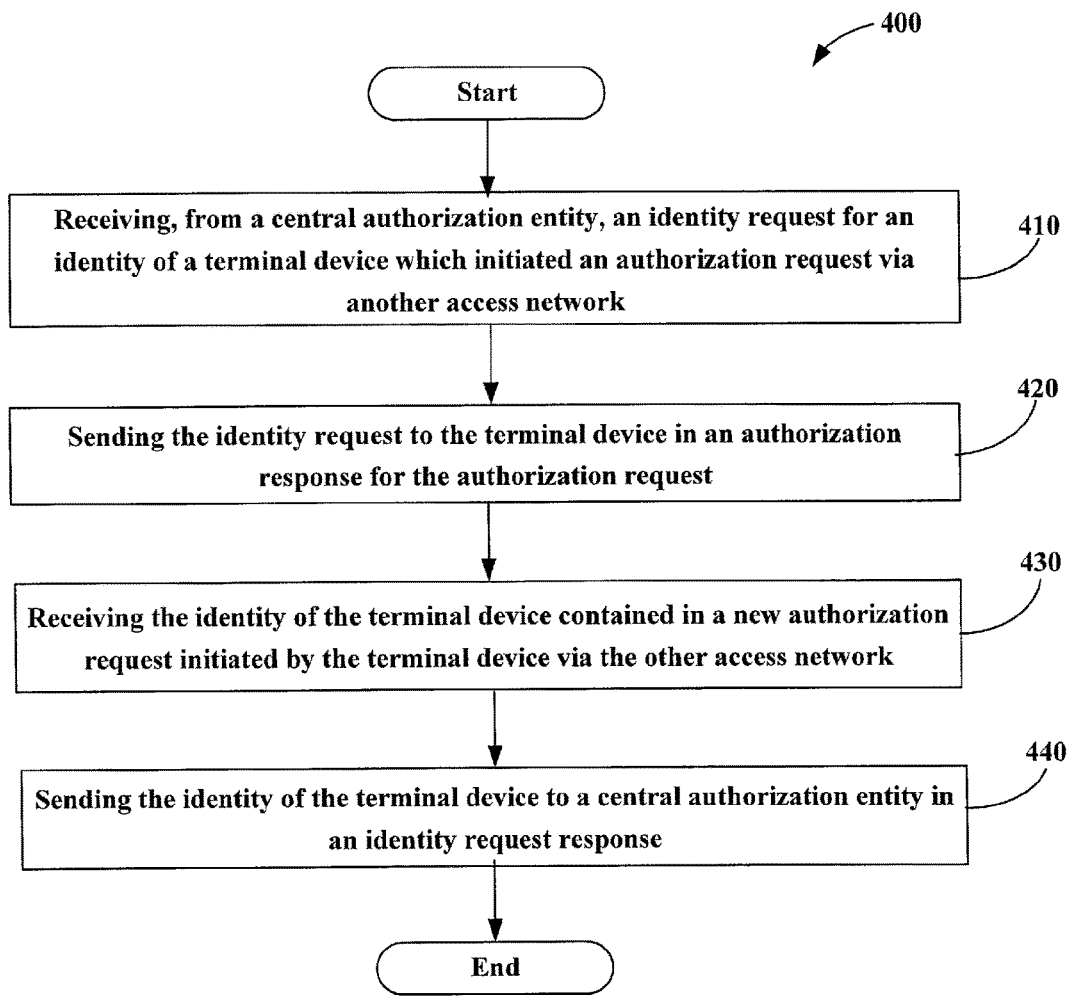
FIG. 4 schematically illustrates a flow chart of a method of device identity check at a gateway of a core network for a wireless network according to an embodiment of the present disclosure.

FIG. 4 s schematically illustrates a flow chart of a method 400 of device identity check at a gateway of a core network for a wireless network according to an embodiment of the present disclosure. Herein, the gateway is a gateway provided so that the terminal device can access the core network via the untrusted or trusted non-3GPP network, which could be the ePDG 125 for the untrusted non-3GPP network or the Wi-Fi GW 110 for the trusted non-3GPP network.

As illustrated in FIG. 4, at step 410, the gateway receives an identity request for the identity of a terminal device from the central authorization entity. When a terminal device is going to access the core network via the Wi-Fi network, it will initiate an authorization request and sends the authorization request via the Wi-Fi network to the gateway. The gateway will receive the authorization request from the terminal device and forwards the authorization request to the central authorization entity such as the AAA server 103. Particularly, in response to the authorization request, the central authorization entity sends back an identity request for the identity of the terminal device to the gateway if the ID check is enabled. Thus, the gateway will receive the identity request for the identity of the terminal device from the central authorization entity. Upon receiving the identity request, at step 420, the gate will send back to the terminal device in an authorization response for the authorization request and the authorization response contains the identity request to indicate the terminal device to provide its identity information. When the terminal device receives the authorization response, it initiates a new authorization request and contains the identity of the terminal device such as IMEI in this new authorization request. In this means, the terminal device provides the identity of the terminal device as indicated in the received authorization response. Thus, the gateway may receive at step 430 the new authorization request and obtains the identity of the terminal device contained therein. Then at step 440, the gateway sends an identity response to the central authorization entity to provide the identity of the terminal device to the central authorization entity. Thus, the central authorization entity could obtain the identity of the terminal device which is required for the ID check.

In order to make the skilled in the art better and thoroughly understand the solution as provided in embodiments of the present disclosure, an example device identity check procedure will be described with reference to FIG. 5, which schematically illustrates a device identity check procedure for a Wi-Fi terminal device according to an embodiment of the present disclosure.

Figure 5:
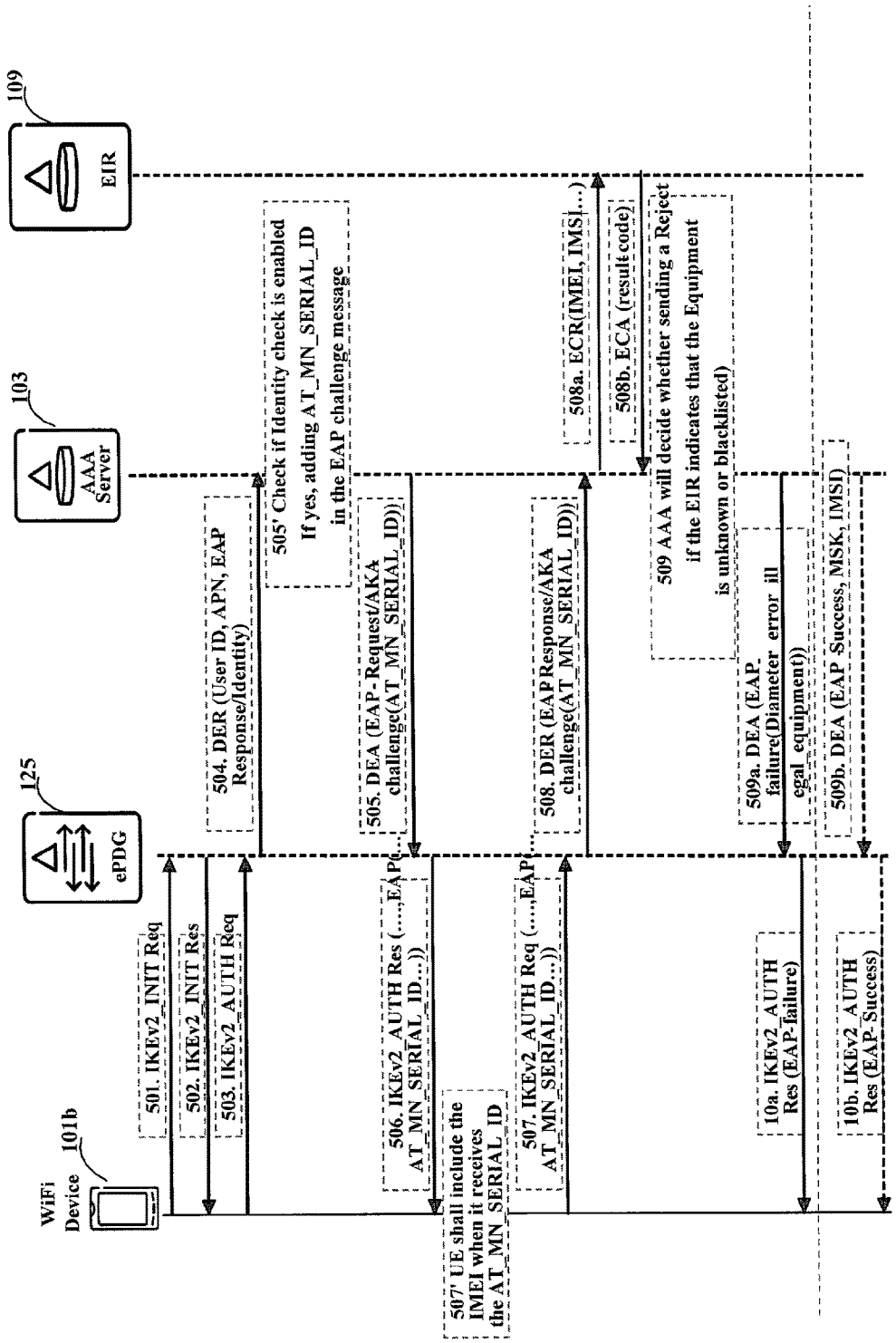
FIG. 5 schematically illustrates an example device identity check procedure for a Wi-Fi device according to an embodiment of the present disclosure.

As illustrated in FIG. 5, first at step 501, the Wi-Fi device 101b sends an "IKEv2_INIT_Req" to the gateway ePDG 125 so as to request initiation of an authorization procedure, and the ePDG 125 sends at step 502, an "IKEv2_INIT_Res" as a response to the "IKEv2_INIT_Req" from the Wi-Fi device 101b In response to the "IKEv2_INIT_Res" from the ePDG 125, the Wi-Fi device 101b sends an authorization request "IKEv2_AUTH_Req" to the ePDG 125 at step 503. The steps 501 to 503 are normal IKEv2 initiation and authorization procedure between UE and ePDG, and thus will not be elaborated herein for a purpose of simplification. The ePDG 125 receives the authorization request "IKEv2_AUTH_Req" and forward the authorization request in a Diameter Extensible Authentication Protocol (EAP) request (DER) "DER (user ID, APN, EAP-Response/Identity)" to the AAA server 103. This DER message contains information such as user ID, access point name (APN), EAP-response/Identity which are required for AAA. At the AAA server, in response to receiving this DER message, the AAA server 103 may check at step 505' whether the ID check is enabled, if the ID check is not enabled, the AAA server 103 will perform the authorization as did in the prior art. Otherwise, if the AAA server 103 determines that the ID check is enabled, it will perform additional operations so that the ID check can be performed. Particularly, the AAA server 103 adds "AT_MN_SERIAL_ID" in the EAP challenge message, which indicates that the AAA server 103 requires the identity of the terminal device. At step 505, the AAA severs 103 sends to the ePDG 125 a Diameter EAP Answer (DEA) "DEA (EAP-Request/AKA-challenge (AT-MN-SERIAL_ID))" containing "AT_MN_SERIAL_ID". This DEA is received at the ePDG 125 and the ePDG 125 will send back an authorization response to the terminal device at step 506 and in the authorization response there is contained "AT-MN-SERIAL_ID" so as to ask the Wi-Fi device 101b to provide its identity. Upon receiving the authorization response, the Wi-Fi device 101b 1 obtains the "AT-MN-SERIAL_ID" in the authorization response and knows that it is required to provide tis identity and thus includes its identity such as IMEI in the AT-MN-SERIAL_ID at step 507'. Thus, at step 507, the Wi-Fi Device sends a new authorization request "IKEv2_AUTH_Req ( . . . , EAP . . . (AT-MN-SERIAL_ID . . . ))" which contains the "AT-MN-SERIAL_ID" to the ePDG 125. The ePDG 125 receives this new authorization request and at step 508 forwards the AT-MN-SERIAL_ID to the AAA server 103 in a DER (EAP-Response/AKA-challenge (AT-MN-SERIAL_ID)), which is an identity response for the identity request sent as step 505.

The AAA sever 103 receives the DER message from the ePDG 125 and obtains the identity of the terminal device in the AT-MN-SERIAL_ID. Thus, the identity of the terminal device is obtained by the AAA server 103 and then at step 508a, the AAA server 103 sends a ME-Identity-Cheek-Request ECR "ECR (IMRI_IMSI . . . )" to the EIR 109, in the ECR message, it includes the identity of the Wi-Fi device, IMEI, and optionally further includes International Mobile Subscriber Identification Number (IMSI). In the EIR 109, there are stored information on the device identities and the corresponding identity attributions which indicate a device identity is in a white list, a grey list or a black list. The EIR 109 will use the information stored in the EIR to perform ID check on the device identity provided by the AAA server 103 and send an ME-Identity-Check-Answer ECA "ECA (result-code)" to the AAA server at step 508b. At the 509', the AAA server will determine the authorization result based on the id check result indicated by the result-code. For example if the result code indicates that the identity of the terminal device is a unknown ID or black-listed, it will determine to send back a rejection message; while if the result code indicates that the identity of the terminal device is in a white list, it will determine to send an authentication success message. Thus, based on the ID check result, the AAA server 103 sends a "DEA (EAP-failure (Diameter_error_illegal_equipment))" to the ePDG 125 at step 509a, or send a "DEA (EAP-success, MSK, IMSI))" to the EPDG at step 509b. Accordingly, at the ePDG 125, it will send back to the Wi-Fi device a failure authorization result "IKEv2_Auth Res (EAP-failure)" at step 510a or send back a success authorization result "IKEv2_Auth Res (EAP-success)" at step 510b.

In embodiments as described above, when a terminal device such as a Wi-Fi device tries to access the core network via an access network (Wi-Fi access network, for example) different from for example 3GPP wireless network, the central authorization entity such as the AAA server 103 will obtain an identity of the terminal device in response to an authorization request from this terminal device. Thus, the central authorization entity could request an identity check entity such as the EIR 109 to check the identity of the terminal device. Therefore, it may check identity status of a terminal device by means of the ID check entity existing in the core network, when the terminal device is connected to the core network via the other access network than the wireless network. Thus the terminal device with an abnormal identity could be discriminated, which enables control of accessing of terminal devices to operator walled garden services via any access network at a low cost. By this means, potential risks brought by being unable to control accessing of the terminal devices to operator walled garden services can be removed and thus a much safer and more reliable device access and device communication can be provided.

In addition, in embodiments of the present disclosure, there are also provided apparatus for device identity check at a central authentication entity of a core network for a wireless network and an apparatus for device identity check at a gateway of a core network for a wireless network according to an embodiment of the present disclosure, which will be described next with reference to FIGS. 6 and 7.

Figure 6:
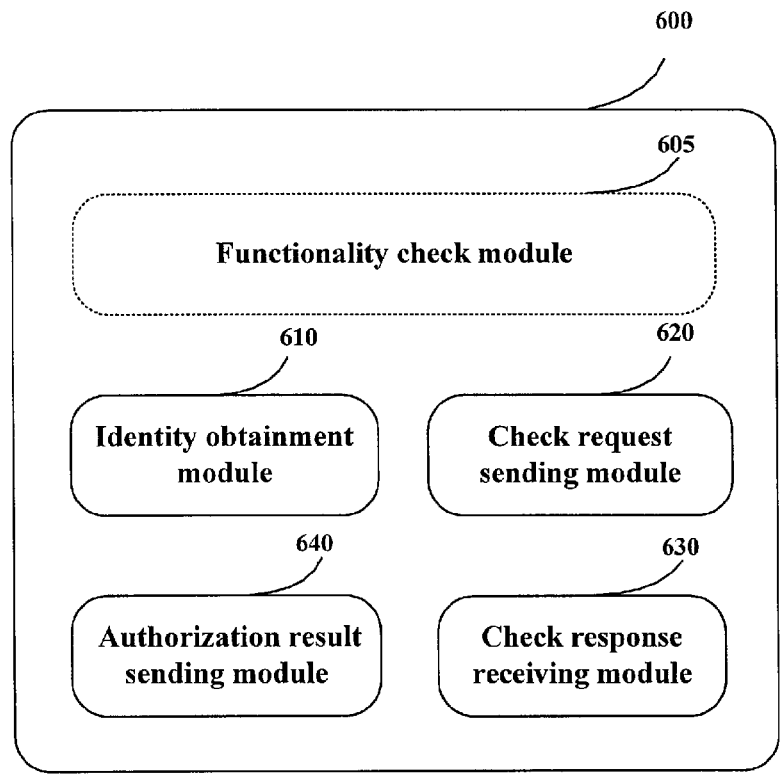
FIG. 6 illustrates a schematic block diagram of an apparatus for device identity check at a central authentication entity of a core network for a wireless network according to an embodiment of the present disclosure.

FIG. 6 illustrates a schematic block diagram of an apparatus 600 for device identity check at a central authentication entity of a core network for a wireless network according to an embodiment of the present disclosure. As illustrated in FIG. 6, the apparatus 600 comprises an identity obtainment module 610, a check request sending module 620, a check response receiving module 630 and an authorization result sending module 640. The identity obtainment module 610 is configured to obtain, in response to an authorization request from a terminal device via another access network, an identity of the terminal device. The check request sending module 620 is configured to send an identity check request containing the identity of the terminal device to an identity check entity. The check response receiving module 630 is configured to receive a check response containing an identity check result for the identity of the terminal device from the identity check entity. The authorization result sending module 640 is configured to send an authorization result for the terminal device based on the identity check result.

In an embodiment of the present disclosure, the identity obtainment module 610 may be configured to send an identity request in response to the authorization request; and receive an identity response containing the identity of the terminal device. Particularly the identity request may be sent in an identity request message to a gateway and the identity response may be received in an identity response from the gateway. The gateway herein is a device provided so that the terminal device so that the Wi-Fi device can access the core network via the other access network, which can be Wi-Fi gateway 110 or the ePDG 125.

In a further embodiment of the present disclosure, the identity request may be further sent to the terminal device at the gateway in an authorization response for the authorization request initiated by the terminal device, and wherein the identity of the terminal device may be received at the gateway in a new authorization request containing the identity of the terminal device (101b).

In a still embodiment of the present disclosure, the apparatus 600 may further comprise a functionality check module 605. The functionality check module may be configured to check whether identity check functionality is enabled. The identity obtainment module may be configured to obtain the identity of the terminal device further in response to determining that the identity check functionality is enabled.

Figure 7:
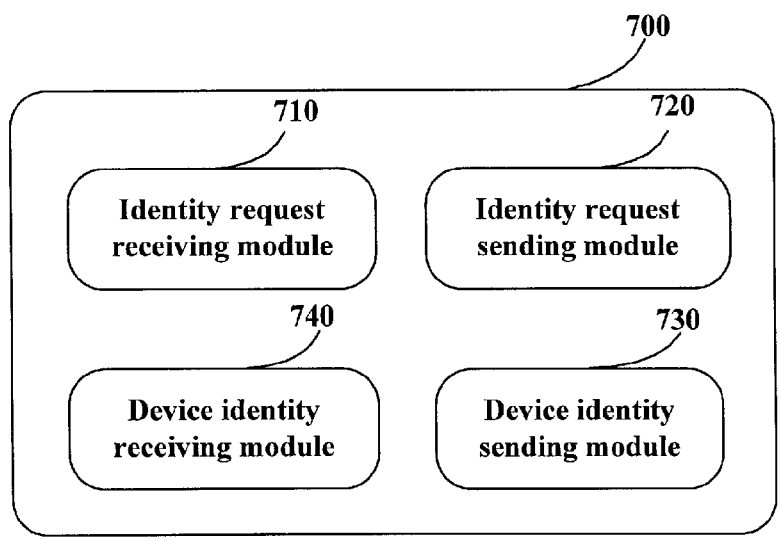
FIG. 7 illustrates a schematic block diagram of an apparatus for device identity check at a gateway of a core network for a wireless network according to an embodiment of the present disclosure.

FIG. 7 illustrates a schematic block diagram of an apparatus 700 for device identity check at a gateway of a core network for a wireless network according to an embodiment of the present disclosure.

As illustrated in FIG. 7, the apparatus 700 comprises: an identity request receiving module 710, an identity request sending module 720, a device identity receiving module 730, and a device identity sending module 740. The identity request receiving module 710 may be configured to receive, from a central authorization entity 103, an identity request for an identity of a terminal device. This terminal device such as a Wi-Fi device is a terminal device which initiated an authorization request via another access network such as Wi-Fi access network. The identity request sending module 720 may be configured to send the identity request to the terminal device in an authorization response for the authorization request. The device identity receiving module 730 may be configured to receive the identity of the terminal device 101b contained in a new authorization request initiated by the terminal device via the other access network. The device identity sending module 740 may be configured to send the identity of the terminal device 101b to the central authorization entity 103 in an identity response.

It can be understood that the above-mentioned modules regarding to FIGS. 6 and 7 can be configured to perform corresponding operations of the methods described with FIGS. 2 to 5 and thus detailed operations of these modules will not be elaborated herein for the conciseness purpose.

Besides, it shall be appreciated that although the above description is made in the context of 3GPP network and Wi-Fi network, it should not be construed as limiting the spirit and scope of the present disclosure. The principle and concept of the present disclosure may be more generally applicable to other networks involving similar problems. For example, the present disclosure can also be used to other non-3GPP access network, such as CDMA network or other similar network. It shall also be appreciated that in the above embodiments, the gateway is described with reference to the ePDG 125; however, it is only for illustrative purpose instead of limitation, and in fact, the principle and concept of the present disclosure can be applicable to other gateway, such as the Wi-Fi GW 110. Moreover, in embodiments of the present disclosure, the SIM device and the Wi-Fi device are described as two different kinds of the terminal devices; however in practice, a terminal device might enable both SIM-based network access and Wi-Fi-based network access. Thus, the SIM device herein indicates a terminal device with a capability enabling SIM-based network access, while the Wi-Fi device indicates a terminal device with a capability enabling Wi-Fi-based network access and the two devices may be two different types of device or the same types of device accessing the networking in different ways. In addition, in the above-described embodiments of the present disclosure, specific examples, scenario, messages, parameters are described but it shall be appreciated that all these contents are illustrated for the illustrative purpose and the skilled in the art could make corresponding modification, addition, deletion or any other forms of changes based on particle requirements.

Figure 8:
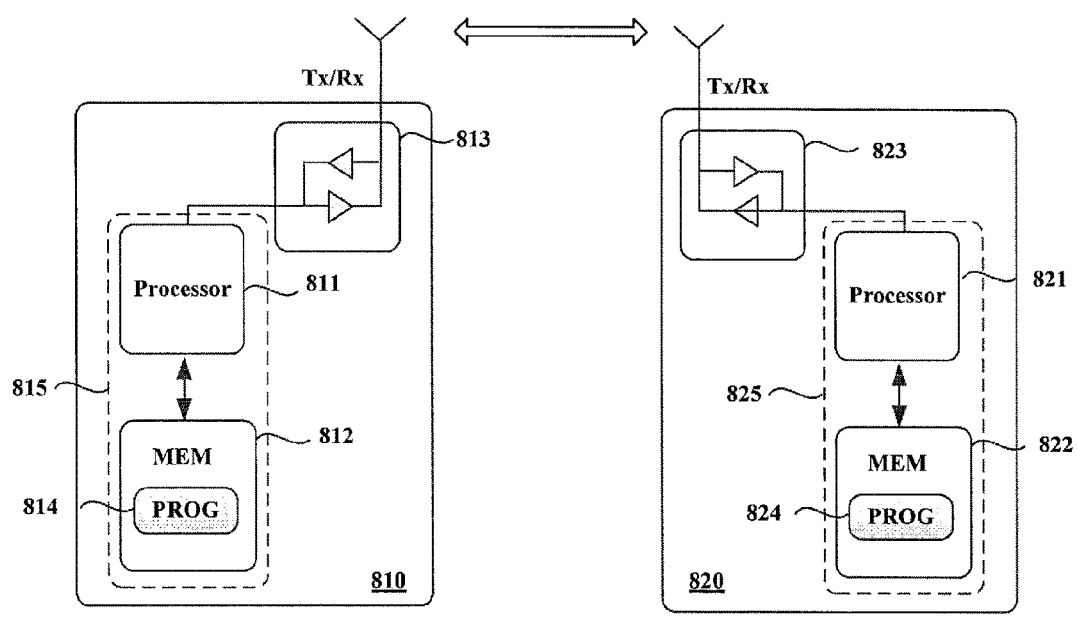
FIG. 8 illustrates a simplified block diagram of an apparatus 810 that may be embodied as or comprised in a gateway of a core network for a wireless network and an apparatus 820 that may be embodied as or comprised in a central authentication entity of a core network for a wireless network as described herein.

FIG. 8 further illustrates a simplified block diagram of an apparatus 810 that may be embodied as or comprised in a gateway of a core network for a wireless network and an apparatus 820 that may be embodied as or comprised in a central authentication entity of a core network for a wireless network as described herein.

The apparatus 810 comprises at least one processor 811, such as a data processor (DP) and at least one memory (MEM) 812 coupled to the processor 811. The apparatus 810 may further comprise a transmitter TX and receiver RX 813 coupled to the processor 811, which may be operable to communicatively connect to the apparatus 820. The MEM 812 stores a program (PROG) 814. The PROG 814 may include instructions that, when executed on the associated processor 811, enable the apparatus 810 to operate in accordance with the embodiments of the present disclosure, for example to perform the methods 400. A combination of the at least one processor 811 and the at least one MEM 812 may form processing means 815 adapted to implement various embodiments of the present disclosure.

The apparatus 820 comprises at least one processor 821, such as a DP, and at least one MEM 822 coupled to the processor 821. The apparatus 820 may further comprise a suitable TX/RX 823 coupled to the processor 821, which may be operable for wireless communication with the apparatus 810. The MEM 822 stores a PROG 824. The PROG 824 may include instructions that, when executed on the associated processor 821, enable the apparatus 820 to operate in accordance with the embodiments of the present disclosure, for example to perform the method 300 or 500. A combination of the at least one processor 821 and the at least one MEM 822 may form processing means 825 adapted to implement various embodiments of the present disclosure.

Various embodiments of the present disclosure may be implemented by computer program executable by one or more of the processors 811, 821, software, firmware, hardware or in a combination thereof.

The MEMs 812 and 822 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 811 and 821 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is clamed is:

1. A method of device identity check at a central authorization entity in a core network for a wireless network, the method comprising:
   obtaining, in response to an authorization request from a terminal device via another access network, an identity of the terminal device, the another access network being different from the wireless network of the central authorization entity;
   sending an identity check request containing the identity of the terminal device to an identity check entity;
   receiving a check response containing an identity check result for the identity of the terminal device from the identity check entity; and
   sending an authorization result for the terminal device based on the identity check result.

2. The method of claim 1, wherein the obtaining an identity of the terminal device comprises:
   sending an identity request in response to the authorization request; and
   receiving an identity response containing the identity of the terminal device.

3. The method of claim 2, further comprising checking whether identity check functionality is enabled, wherein the identity of the terminal device is obtained further in response to determining that the identity check functionality is enabled.

4. The method of claim 2, wherein the identity request is sent, in an identity request message, to a gateway for accessing the core network by the terminal device via the another access network, and wherein the identity response is received in an identity response from the gateway.

5. The method of claim 4, further comprising checking whether identity check functionality is enabled, wherein the identity of the terminal device is obtained further in response to determining that the identity check functionality is enabled.

6. The method of claim 4, wherein the identity request is further sent to the terminal device at the gateway in an authorization response for the authorization request, and wherein the identity of the terminal device is received at the gateway in a new authorization request containing the identity of the terminal device.

7. The method of claim 6, further comprising checking whether identity check functionality is enabled, wherein the identity of the terminal device is obtained further in response to determining that the identity check functionality is enabled.

8. The method of claim 1, further comprising checking whether identity check functionality is enabled, wherein the identity of the terminal device is obtained further in response to determining that the identity check functionality is enabled.

9. A method for device identity check at a gateway in a core network for a wireless network, the method comprising:
   receiving, from a central authorization entity, an identity request for an identity of a terminal device which initiated an authorization request via another access network, the another access network being different from the wireless network of the central authorization entity;
   sending the identity request to the terminal device in an authorization response for the authorization request;
   receiving the identity of the terminal device contained in a new authorization request initiated by the terminal device via the another access network; and
   sending the identity of the terminal device to the central authorization entity in an identity response.

10. An apparatus for device identity check at a central authorization entity in a core network for a wireless network, the apparatus comprising at least one processor configured to cause the apparatus to:
    obtain, in response to an authorization request from a terminal device via another access network, an identity of the terminal device, the another access network being different from the wireless network of the central authorization entity;
    send an identity check request containing the identity of the terminal device to an identity check entity;
    receive a check response containing an identity check result for the identity of the terminal device from the identity check entity; and
    send an authorization result for the terminal device based on the identity check result.

11. The apparatus of claim 10, wherein the at least one processor is configured to cause the apparatus to:

send an identity request in response to the authorization request; and receive an identity response containing the identity of the terminal device.

12. The apparatus of claim 11, wherein the at least one process is further configured to cause the apparatus to check whether identity check functionality is enabled to obtain the identity of the terminal device further in response to a determination that the identity check functionality is enabled.

13. The apparatus of claim 11, wherein the identity request is sent, in an identity request message, to a gateway for accessing the core network by the terminal device via the another access network, and wherein the identity response is received in an identity response from the gateway.

14. The apparatus of claim 13, wherein the identity request is further sent to the terminal device at the gateway in an authorization response for the authorization request, and wherein the identity of the terminal device is received at the gateway in a new authorization request containing the identity of the terminal device.

15. The apparatus of claim 13, wherein the at least one processor is further configured to cause the apparatus to check whether identity check functionality is enabled and to obtain the identity of the terminal device further in response to a determination that the identity check functionality is enabled.

16. The apparatus of claim 14, wherein the at least one processor is further configured to cause the apparatus to check whether identity check functionality is enabled, and to obtain the identity of the terminal device further in response to a determination that the identity check functionality is enabled.

17. The apparatus of claim 10, wherein the at least one processor is further configured to cause the apparatus to check whether identity check functionality is enabled and to obtain the identity of the terminal device further in response to a determination that the identity check functionality is enabled.

* * * * *